United States Patent
Oda et al.

(10) Patent No.: US 7,473,294 B2
(45) Date of Patent: *Jan. 6, 2009

(54) NITROGEN-CONTAINING METAL POWDER, PRODUCTION PROCESS THEREOF, AND POROUS SINTERED BODY AND SOLID ELECTROLYTIC CAPACITOR USING THE METAL POWDER

(75) Inventors: Yukio Oda, Fukushima (JP); Tomoo Izumi, Fukushima (JP); Yoshikazu Noguchi, Fukushima (JP)

(73) Assignee: Cabot Supermetals K.K., Tokyo (JP)

( * ) Notice: Subject to any disclaimer, the term of this patent is extended or adjusted under 35 U.S.C. 154(b) by 192 days.

This patent is subject to a terminal disclaimer.

(21) Appl. No.: 11/447,063

(22) Filed: Jun. 5, 2006

(65) Prior Publication Data

US 2006/0230877 A1    Oct. 19, 2006

Related U.S. Application Data

(60) Continuation of application No. 10/174,826, filed on Jun. 20, 2002, now Pat. No. 7,066,975, which is a division of application No. 09/626,079, filed on Jul. 26, 2000, now Pat. No. 6,432,161.

(60) Provisional application No. 60/194,896, filed on Apr. 6, 2000.

(30) Foreign Application Priority Data

Feb. 8, 2000    (JP)    .............................. P2000-31029

(51) Int. Cl.
    *C22C 29/16*    (2006.01)
(52) U.S. Cl. .......................................... 75/244; 75/252
(58) Field of Classification Search ................. 75/244, 75/252
    See application file for complete search history.

(56) References Cited

U.S. PATENT DOCUMENTS

| | | | |
|---|---|---|---|
| 2,950,185 A | 8/1960 | Martin et al. | |
| 3,295,951 A | 1/1967 | Fincham et al. | ............... 75/0.5 |
| 3,825,802 A | 7/1974 | Kumagai et al. | |
| 4,149,876 A | 4/1979 | Rerat | |
| 4,397,682 A | 8/1983 | Watanabe et al. | |
| 4,512,805 A | 4/1985 | Albrecht et al. | ............... 75/244 |
| 5,234,491 A | 8/1993 | Chang | |
| 5,442,978 A | 8/1995 | Hildreth et al. | |
| 5,448,447 A | 9/1995 | Chang | |
| 5,825,611 A | 10/1998 | Pozdeev | |
| 6,051,044 A | 4/2000 | Fife | |
| 6,193,779 B1 | 2/2001 | Reichert et al. | |
| 6,238,456 B1 | 5/2001 | Wolf et al. | ..................... 75/245 |
| 6,375,704 B1 | 4/2002 | Habecker et al. | |
| 6,423,110 B1 | 7/2002 | Naito et al. | |
| 6,432,161 B1 | 8/2002 | Oda et al. | |
| 6,540,810 B2 | 4/2003 | Naito et al. | |
| 6,679,934 B2 | 1/2004 | Rao et al. | |
| 6,876,542 B2 | 4/2005 | Oda et al. | |
| 7,066,975 B2 * | 6/2006 | Oda et al. | ..................... 75/244 |
| 2002/0088507 A1 | 7/2002 | Rao et al. | |

FOREIGN PATENT DOCUMENTS

| | | |
|---|---|---|
| DE | 31 40 248 A1 | 9/1983 |
| EP | 0 665 302 A2 | 8/1995 |
| WO | WO 98/37248 | 8/1998 |
| WO | WO 99/57739 | 11/1999 |

OTHER PUBLICATIONS

Erzmetall, "Die Bedeutung des Tantals in der Kondensatorindustrie," vol. 48, No. 6/7, pp. 430-434 (1995) (with partial English translation).

Communication of a Notice of Opposition for EP Patent No. 1 255 872 B1 (with English Translation).

ASM Materials Engineering Dictionary, ed., by J.R. Davis, ASM International, 1992, p. 431.

Communication of Commencement of Proceedings before the Board of Appeal for EP Patent No. 1 255 872 B1, dated Feb. 21, 2006 (with English translation).

(Continued)

*Primary Examiner*—George Wyszomierski
(74) *Attorney, Agent, or Firm*—Kilyk & Bowersox, P.L.L.C.

(57) ABSTRACT

An object of the present invention is to provide nitrogen-containing metallic powder at high productivity, which powder contains a metal such as niobium or tantalum containing nitrogen uniformly, and enables production of an anode electrode that has high specific capacitance and low leakage current and that exhibits excellent reliability for a prolonged period of time. There is provided nitrogen-containing metallic powder which is a solid solution containing 50-20,000 ppm nitrogen, in which the metal that constitutes the metallic powder is niobium or tantalum. The nitrogen-containing metallic powder is produced through the process in which while a metallic compound is reduced with a reducing agent, a nitrogen-containing gas is introduced into a reaction system to thereby form metal, and nitrogen is simultaneously incorporated into metal. A porous sintered body comprising the nitrogen-containing metallic powder and a solid electrolytic capacitor comprising the powder have low leakage current and exhibit excellent reliability for a prolonged period of time.

14 Claims, No Drawings

OTHER PUBLICATIONS

Experimental Report on a Reworking of Examples 4 and 7 of D2 (WO-A-98/37249) (with English translation).
Partial translation dated Dec. 20, 2007 of the Office Action from the Czech Patent Office for Czech Patent Application No. 2002-2680 (3 pages).
English Translation of the Grounds of Appeal dated Apr. 13, 2006 from the Opposition of European Patent 1 255 872, including D7 (17 pages).
English Translation of Document D6, "The Importance of Tantalum for the Capacitor Market," from the Opposition of European Patent 1 255 872, with copy of D6 in German (8 pages).
In Response to the Official Communication dated Apr. 24, 2006, and the Substantiation of Appeal filed by the Opponent on Apr. 13, 2006 in the Opposition against European Patent No. 1 255 872 dated Jan. 3, 2007 with Main Request, First Auxiliary Request, Second Auxiliary Request, Third Auxiliary Request, and Fourth Auxiliary Request filed in the Opposition to European Patent No. 1 255 872 (24 pages).
In Response to the Summons to Attend Oral Proceedings dated Sep. 28, 2007 filed in the Opposition of European Patent No. 1 255 872 dated Jan. 8, 2008 with attachments (18 pages).
Letter from Dr. Fabian Berglechner, Patentassesor, to the European Patent Office, dated Sep. 24, 2007, filed in the Opposition of European Patent 1 255 872 (5 pages).
Summons to Oral Proceedings Pursuant to Rule 71(1) EPC dated Sep. 28, 2007 from the European Patent Office, filed in the Opposition to European Patent No. 1 255 872 (5 pages).
English translation of Brief filed by Pfenning et al., Law Firm on Jan. 11, 2008 in the Opposition to European Patent No. 1 255 872 with English partial translations of D11-D13 (17 pages).
Provision of a copy of the Minutes in accordance with Rule 76(4) EPC from the European Patent Office dated Dec. 8, 2005 in the Opposition to European Patent No. 1 255 872 (43 pages).
Letter from Strehl Schubel-Hopf & Partner dated Oct. 14, 2005 to the European Patent Office in response to the summons to attend oral proceedings dated Jan. 26, 2005 with attachments filed in the Opposition to European Patent No. 1 255 872 (14 pages) with English translation of Letter dated Oct. 14, 2005 from Starck to the European Patent Office and English translation and A1 and A2.
Decision on Appeal from the Oral Proceedings dated Feb. 13, 2008 for European Patent No. 1255872, mailed Mar. 14, 2008 (15 pages).
Handwritten Minutes of the Oral Proceedings of Feb. 13, 2008 for European Patent No. 1255872, mailed Mar. 11, 2008 (6 pages).
Typewritten Minutes of the Oral Proceedings of Feb. 13, 2008 for European Patent No. 1255872, mailed Feb. 21, 2008 (5 pages).

\* cited by examiner

NITROGEN-CONTAINING METAL POWDER, PRODUCTION PROCESS THEREOF, AND POROUS SINTERED BODY AND SOLID ELECTROLYTIC CAPACITOR USING THE METAL POWDER

CROSS REFERENCE TO RELATED APPLICATIONS

This application is a continuation of U.S. patent application Ser. No. 10/174,826 filed under 35 U.S.C. § 111(a) on Jun. 20, 2002 now U.S. Pat. No. 7,066,975 which, in turn, is a divisional of U.S. patent application Ser. No. 09/626,079 filed under 35 U.S.C. § 111(a) on Jul. 26, 2000, now U.S. Pat. No. 6,432,161 B1, claiming benefit pursuant to 35 U.S.C. § 119(e)(1) of the filing date of Provisional Application No. 60/194,896 filed Apr. 6, 2000 pursuant to 35 U.S.C. § 111(b), the disclosures of which are incorporated herein by reference.

TECHNICAL FIELD OF THE INVENTION

The present invention relates to nitrogen-containing metallic powder which is suitably employed in an anode electrode of a solid electrolytic capacitor and a method for producing the powder, and to a porous sintered body comprising the powder and a solid electrolytic capacitor comprising the powder.

BACKGROUND OF THE INVENTION

In recent years, there has been demand for an electronic integrated circuit that can be driven at low voltage and that has high frequency and low noise. There has also been demand for a solid electrolytic capacitor that has low ESR and ESL. Metallic powder which is suitably employed in an anode electrode of a solid electrolytic capacitor may include, for example, powder of niobium, tantalum, titanium, tungsten, or molybdenum.

A tantalum capacitor, a typical capacitor which has small size, low ESR, and high capacitance, has rapidly become popular as a component in cellular phones and personal computers. Particularly, in a smoothing circuit of an exclusive power source of a microprocessor, the capacitor must have high capacitance (high CV value) and low ESR. The capacitance of a tantalum capacitor is effectively increased by increasing the surface area of fine metallic powder which is employed. Therefore, fine tantalum powder has been developed. At the present time, by means of a method in which potassium tantalum fluoride is thermally-reduced by use of sodium, the resultant primary powder is thermally-aggregated and deoxidized, and tantalum powder having a BET specific surface area of approximately 1 $m^2/g$ (mean primary particle size on the basis of specific surface area ($d_{50}$)=400 nm) and a specific capacitance of 50,000 CV is produced in large amounts.

A niobium capacitor has long been studied as a solid electrolytic capacitor, since niobium oxide has a high dielectric constant and niobium is inexpensive compared with tantalum. However, the capacitor has not yet been employed in practice because of the low reliability of oxide film produced through anodizing. Namely, when niobium is oxidized through anodizing at high voltage, amorphous oxide film is crystallized, and thus leakage current increases and the capacitor is frequently broken.

However, recently, an electronic circuit has been driven at low voltage, and thus anodizing voltage can be lowered. In accordance with this trend, a niobium capacitor may be advantageously employed in practice, since niobium can maintain reliability at low anodizing voltage. Particularly, as a substitution for an aluminum electrolytic capacitor, a niobium capacitor, which has high capacitance and low ESR and ESL compared with an aluminum electrolytic capacitor, has become of interest for development.

In order to produce a niobium capacitor of high capacitance, niobium powder employed in the capacitor must have a mean primary particle size as reduced to BET specific surface area ($d_{50}$) of 500 nm or less, preferably 400 nm or less, in the same manner as in the case of a tantalum powder. At the present time, known methods for producing fine niobium powder include a method in which potassium fluoniobate is reduced with sodium (U.S. Pat. No. 4,684,399); a method in which niobium pentachloride is reduced with hydrogen in a gas phase (Japanese Patent Application Laid-Open (kokai) No. 6-25701); and a method in which niobium powder of large specific surface area is obtained through grinding (WO 98/19811).

Of these methods, in a customary gas-phase method, superfine niobium particles of mono-dispersion are obtained, and thus when a porous sintered body is formed and the compact is oxidized through anodizing, a neck portion is insulated, i.e., the neck is broken. Namely, in a gas-phase method, niobium powder which is suitably employed in an anode electrode cannot be obtained. In a grinding method, niobium powder is easily obtained at high efficiency, but the shape of the particles is irregular and the particle size distribution becomes broad, and thus the particles cause problems when they are employed in an anode electrode.

Therefore, in order to produce niobium powder particles of chain-type which are suitably employed in an anode electrode and which exhibit a sharp peak in the particle size distribution of the primary particles, a liquid-phase method such as a method for reducing a molten potassium fluoride salt with sodium or a method for reducing niobium chloride with molten metal is considered to be preferable.

When such fine niobium or tantalum powder is employed for producing an anode electrode of high capacitance, crystalline oxide tends to form during thermal treatment or oxidation through anodizing, and thus leakage current may increase. This is because when the surface area of the powder increases, the amount of oxygen in the powder also increases. Incidentally, anodizing voltage for forming a dielectric oxide film is lowered in accordance with reduction in rated voltage of a capacitor. Therefore, the formed dielectric oxide film tends to become thin, and the film has poor long-term reliability in spite of high capacitance.

In view of the foregoing, in order to suppress the effect of oxygen and enhance reliability of a thin film, a sintered body or a dielectric oxide film is doped with nitrogen after production thereof.

For example, U.S. Pat. No. 5,448,447 discloses a method in which an oxide film produced through anodizing is doped with nitrogen in order to lower the leakage current of the film and to enhance the stability and reliability of the film at high temperature. WO 98/37249 discloses a method for doping tantalum powder of high capacitance uniformly with nitrogen, in which ammonium chloride is added to reduced tantalum powder and nitrogen is introduced into the mixture simultaneously with thermal agglomeration of the mixture.

Other techniques include reduction in leakage current of an Nb—O film which is produced through sputtering of niobium, by doping the film with nitrogen (K. Sasaki et al., Thin Solid Films, 74 (1980) 83-88); and improvement of leakage current of an anode by employing a niobium nitride sintered body as the anode (WO 98/38600).

Japanese Patent Application Laid-Open (kokai) No. 8-239207 discloses a heating nitridation method in which tantalum or niobium powder which is obtained through reduction is heated in an atmosphere of nitrogen-containing gas, during thermal agglomeration or deoxidization.

In customary methods, nitridation proceeds on the surface of powder or film, and thus diffusion of nitrogen determines the rate of nitridation. As a result, the surface tends to be nitrided non-uniformly.

When the amount of nitrogen in a metallic powder is in excess of 3,000 ppm, for example, in the case of tantalum powder, crystalline nitride such as $TaN_{0.04}$, $TaN_{0.1}$, or $Ta_2N$ is formed. When the powder is further doped with nitrogen, a crystal phase predominantly containing TaN or $Ta_2N$ is formed. When powder containing such a crystalline nitride is employed, the specific capacitance of an anode electrode is lowered and reliability of a dielectric film is reduced.

Meanwhile, when a sintered body or a dielectric oxide film is doped with nitrogen after production thereof, a nitridation process is additionally required, which results in poor productivity.

Briefly, there has not yet been found a nitrogen-containing metallic compound in which fine niobium or tantalum is uniformly doped with a sufficient amount of nitrogen, a crystalline nitride compound is not formed, and nitrogen is contained to form a solid solution within the metallic crystal lattice.

SUMMARY OF THE INVENTION

In view of the foregoing, an object of the present invention is to produce a nitrogen-containing metallic powder in which nitrogen is uniformly contained to form a solid solution within metallic crystal lattice at high productivity, and to provide a solid electrolytic capacitor which has high specific capacitance and low leakage current, and exhibits excellent reliability for prolonged periods of time.

The nitrogen-containing metallic powder of the present invention is a solid solution comprising 50-20,000 ppm nitrogen, characterized in that the metal that constitutes the metallic power is niobium or tantalum.

The method for producing the nitrogen-containing metallic powder of the present invention is characterized in that while a niobium or tantalum compound is reduced with a reducing agent, a nitrogen-containing gas is introduced into a reaction system to thereby form niobium or tantalum, and nitrogen is simultaneously incorporated into the niobium or tantalum.

Preferably, the aforementioned niobium or tantalum compound is a potassium fluoride salt or a halide.

Preferably, the aforementioned niobium compound is potassium fluoroniobate.

Preferably, the aforementioned reducing agent is at least one species selected from among sodium, magnesium, calcium, magnesium hydride, and calcium hydride, or a hydrogen-containing gas.

In the aforementioned method, preferably, the nitrogen-containing metallic powder is a solid solution comprising 50-20,000 ppm nitrogen.

Preferably, the aforementioned nitrogen-containing gas contains pure nitrogen gas and/or nitrogen-generating gas which generates nitrogen gas by heating.

A porous sintered body formed of the nitrogen-containing metallic powder of the present invention is suitably employed in an anode electrode.

DETAILED DESCRIPTION OF THE PREFERRED EMBODIMENTS

The nitrogen-containing metallic powder of the present invention is powder of niobium or tantalum, which contains 50-20,000 ppm nitrogen taking a form of solid solution. When nitrogen is incorporated into metal to form a solid solution, the lattice constant of metallic crystal varies, and thus incorporation of nitrogen into metal to form a solid solution can be determined by a shift in the position of the metal peak in X-ray diffraction.

Niobium or tantalum is preferably employed in an electrode of a solid electrolytic capacitor, since the electrode has high specific capacitance. For example, when tantalum is a solid solution containing 4,000 ppm nitrogen, a distance (d) between (110) planes of metallic tantalum is increased by approximately 0.1%, i.e., from d=2.3375 Å to d=2.3400 Å.

The nitrogen-containing metallic powder of the present invention has a mean particle size on the basis of BET specific surface area of 80-500 nm, preferably 80-360 nm. When fine nitrogen-containing metallic particles having such a mean size are employed for producing a porous sintered body and the compact is employed as an anode electrode of a solid electrolytic capacitor, the electrode can have high capacitance, which is preferable.

The above-described nitrogen-containing metallic powder can be produced as described below. While a niobium or tantalum compound is being reduced, a nitrogen-containing gas is introduced into the reaction system to thereby form niobium or tantalum, and nitrogen is simultaneously incorporated into that niobium or tantalum. In this case, the reaction may be carried out in a liquid-phase or gas-phase system, so long as reduction of metal is carried out simultaneously with the introduction of nitrogen.

No particular limitation is imposed on the type of niobium compound or tantalum compound which may be employed in the present invention, but potassium fluoride salts or halides of niobium or tantalum are preferable. Examples of such potassium fluoride salts include $K_2TaF_7$, $K_2NbF_7$, and $K_2NbF_6$. Examples of such halides include chlorides such as niobium pentachloride, niobium subchloride, tantalum pentachloride, and tantalum subchloride; iodides; and bromides. Particularly, examples of niobium compounds include fluoroniobates such as potassium fluoroniobate, and oxides such as niobium pentoxide.

Examples of reducing agents include alkali metals and alkali earth metals such as sodium, magnesium, and calcium; hydrides of these metals such as magnesium hydride and calcium hydride; and reducing gasses such as hydrogen-containing gas.

Examples of nitrogen-containing gasses include gasses containing pure nitrogen and gasses containing nitrogen-generating gas which generates nitrogen by heating. Examples of nitrogen-generating gasses include ammonia and urea. In order to effectively incorporate nitrogen into metal to form a solid solution, pure nitrogen gas is preferably employed.

Methods for introducing nitrogen-containing gas into a reaction system will be described. When the reaction is performed in a liquid phase, nitrogen is preferably introduced into the phase through bubbling. When the reaction is performed in a gas phase, nitrogen may be mixed into raw material gas or into gas which is employed as a reducing agent in advance. Alternatively, nitrogen may be mixed into the gas phase singly.

Specific methods for producing metallic powder in a liquid phase include reduction of metal in molten salts. Such a method will be described by taking tantalum metal as an example.

Firstly, a eutectic salt such as KCl—KF or KCl—NaCl serving as a diluting salt is added into a reaction container, and the salt is melted by heating it to 800-900° C. A nozzle is provided in the salt, and nitrogen-containing gas is introduced into the salt through the nozzle, and the salt is subjected to bubbling of the gas. While the salt is being subjected to bubbling of the gas, a portion of a potassium fluoride salt of tantalum is added to the salt, and then a reducing agent such as sodium, magnesium, or calcium is added to the salt in an amount which is stoichiometrically required to reduce the potassium fluoride salt, to thereby carry out the reaction represented by the following formula (1).

$$K_2TaF_7 + 5\ Na \rightarrow 2\ KF + 5\ NaF + Ta \quad (1)$$

When the reaction between the potassium fluoride salt and the reducing agent is almost completed, a portion of the potassium fluoride salt of tantalum and a portion of the reducing agent are added to the reaction container. As described above, a tantalum compound serving as a raw material and a reducing agent are added into the reaction container in small amounts, to thereby carry out the reaction repeatedly and complete reduction of the tantalum compound.

The total amount of nitrogen gas which is introduced is determined to be 3-20 times the desired amount of nitrogen in the tantalum. When the amount of nitrogen gas in the tantalum is more than 20 times the desired amount, the tantalum may react with the nitrogen, and a crystalline tantalum nitride may be formed. Consequently, when the resultant tantalum powder is employed in an anode electrode, the leakage current of the electrode may increase, and the capacitance of the electrode may be lowered. In contrast, when the amount of nitrogen in tantalum is less than three times the desired amount of nitrogen in the tantalum, the amount of nitrogen to form a solid solution in tantalum may be lowered. Consequently, when the resultant tantalum powder is employed in an anode electrode, reliability of the electrode may be insufficiently enhanced.

The amount of a diluting salt is preferably determined such that the weight of the salt is 2-10 times the total weight of a potassium fluoride salt of tantalum and a reducing agent. When the amount of the diluting salt is less than twice the combined weight of the fluoride salt and the agent, the concentration of the fluoride salt serving as a raw material becomes high, and reaction proceeds quickly, and thus the size of the formed tantalum particles may become very large. In contrast, when the amount of the diluting salt is in excess of 10 times the combined weight, reaction rate is lowered, resulting in poor productivity. Incidentally, the reaction may be carried out in an atmosphere of inert gas, or under reduced pressure.

As described above, while a potassium fluoride salt of a metal is reduced, nitrogen gas is introduced into a molten salt and the molten salt is subjected to bubbling of nitrogen. As a result, nitrogen gas rapidly diffuses over the surface of the primary particles of the metal immediately after they are produced through reduction, and growth of the particles and introduction of nitrogen in the grown surface of the particles proceed simultaneously.

The thus-obtained metallic powder uniformly contains nitrogen to form a solid solution from the surface of the particles to the inside, and rarely contains a crystalline nitrogen compound.

Fine metallic particles can be precipitated by carrying out the reaction in a large amount of a diluting salt and by lowering the concentration of a potassium fluoride salt in a reaction system.

Another method for producing nitrogen-containing metallic powder in such a molten diluting salt will next be described. For example, a halide of niobium or tantalum is reacted with a reducing agent such as sodium, magnesium, or calcium in a diluting salt in the same manner as described above, and during the reaction, nitrogen-containing gas is introduced into the salt for bubbling. The halide may be a gas or liquid, so long as the halide can be brought into contact with the reducing agent which is melted in the diluting salt. Particularly, the halide is preferably a subhalide which is highly soluble in the diluting salt. Such a subhalide can be obtained, for example, by bringing gas of niobium pentachloride into contact with niobium metal at a high temperature of 500° C. or more for reduction. The temperature of molten salt is set at 700-1,000° C. The amount of nitrogen gas which is introduced into a metal is determined such that the total amount of nitrogen gas is 3-20 times the desired amount of nitrogen in the metal. The amount of a diluting salt is preferably determined such that the weight of the salt is 2-10 times the total weight of a halide of niobium or tantalum.

Other methods for producing a nitrogen-containing powder include a method in which potassium fluoroniobate is employed as a niobium compound and a method in which a metallic oxide such as niobium pentoxide is reduced with molten magnesium or calcium.

After completion of reduction, molten liquid is cooled, and the resultant solid cake is repeatedly washed with water or a weakly acidic aqueous solution, to thereby remove the diluting salt and yield nitrogen-containing metallic powder. In the above procedure, if necessary, operations such as centrifugation and filtration may be employed in combination, and the formed particles may be washed with a solution containing hydrofluoric acid and hydrogen peroxide, for purification of the particles.

Specific examples of methods for producing nitrogen-containing metallic powder in a gas-phase include a method in which a volatile halide of a metal such as niobium or tantalum is reduced with hydrogen-containing gas in the presence of nitrogen gas by mixing nitrogen-containing gas into a gas phase during reduction. The nitrogen-containing gas may be mixed with the volatile halide and/or the hydrogen-containing gas in advance, or may be mixed into a gas phase singly. In this case, the amount of nitrogen gas may be determined such that the amount becomes at least twice the desired amount of nitrogen in the metal which is formed through reduction.

The thus-obtained nitrogen-containing metallic powder, i.e., niobium or tantalum powder is subjected to pre-treatment such as thermal agglomeration, deoxidation, passivation, and stabilization. Subsequently, the powder is shaped and sintered, producing a porous sintered body.

The thermal agglomeration treatment is carried out in order to transform the very fine particles in the powder into secondary particles of relatively large size, by heating nitrogen-containing metallic powder under a vacuum for agglomeration. A porous sintered body which is produced by sintering relatively large-sized secondary particles contains large pores as compared with a porous sintered body which is produced from very fine particles. Therefore, when the former sintered body is employed as an anode electrode, an electrolytic solution is penetrated into the inside of the sintered body, enabling the electrode to have high capacitance. When nitrogen-containing particles are heated under a vacuum, an impurity such as sodium or magnesium derived from a diluting salt can be removed from the particles.

Usually, thermal agglomeration is carried out by heating nitrogen-containing powder at 800-1,400° C. under a vacuum for 0.5-2 hours. Before thermal agglomeration, pre-agglomeration, in which water is added to nitrogen-containing powder so as to wet all of the powder uniformly while the powder is vibrated, is preferably carried out. When such pre-agglomeration is carried out, stronger agglomerates may be obtained. When phosphorous or boron (10-300 ppm with respect to metal in nitrogen-containing metallic powder) is added to water that is employed in pre-agglomeration in advance, fusion of primary particles is prevented, and thus the particles may be thermally agglomerated while maintaining high surface area. Phosphorous which is added to water may take the form of phosphoric acid or ammonium hexafluorophosphide.

Subsequently, cake-like powder obtained through thermal agglomeration is milled in air or inert gas, and a reducing agent such as magnesium is added to the particles, to thereby react oxygen in the particles with the reducing agent for deoxidation.

Deoxidation is carried out in an atmosphere of inert gas such as argon for 1-3 hours at a temperature within a range between the melting point of a reducing agent or higher and the boiling point thereof or lower. Subsequently, while the particles are cooled, air is introduced into argon gas for subjecting the nitrogen-containing metallic powder to passivation and stabilization. Thereafter, a substance derived from the reducing agent, which remains in the powder, such as magnesium or magnesium oxide is removed by acid leaching.

To the nitrogen-containing metallic powder which is subjected to thermal agglomeration, deoxidation, passivation, and stabilization, camphor ($C_{10}H_{16}O$) or a similar compound serving as binder is added in an amount of approximately 3-5 wt. %. The resultant mixture is press-shaped, and heated and sintered at 1,000-1,400° C. for approximately 0.3-1 hour, producing a porous sintered body. The sintering temperature may appropriately be determined in accordance with the type of metal and the surface area of powder.

When such a porous sintered body is employed as an anode electrode, a lead wire is buried in nitrogen-containing metallic powder when the powder is press-shaped. Subsequently, the powder is sintered to thereby produce a sintered body combined with the lead wire. Thereafter, the compact is oxidized through anodizing, for example, in an electrolytic solution containing phosphoric acid or nitric acid in an amount of approximately 0.1 wt. % for one to three hours at a temperature of 30-90° C., a current density of 40-80 mA/g, and a voltage of 20-60 V. The thus-obtained sintered body is employed as an anode electrode of a solid electrolytic capacitor.

Specifically, a solid electrolytic layer formed of manganese dioxide, lead oxide, or a conductive polymer, a graphite layer, and a silver paste layer are sequentially formed on the above-obtained porous sintered body by means of a known method. Subsequently, a cathode terminal is connected to the silver paste layer by use of a solder, and the resultant compact is coated with a resin, to thereby produce an anode electrode which is employed in a solid electrolytic capacitor.

The above-described nitrogen-containing metallic powder is a solid solution containing 50-20,000 ppm nitrogen uniformly, and rarely contains a crystalline nitride. Therefore, when the powder is employed, an anode electrode that has high specific capacitance and low leakage current and that exhibits excellent reliability for a prolonged period of time can be produced.

In the method for producing the nitrogen-containing metallic powder, while a metallic compound is reduced with a reducing agent, a nitrogen-containing gas is introduced into the reaction system to thereby form metal, and nitrogen is simultaneously incorporated into the metal. As a result, nitrogen gas rapidly diffuses over the surface of primary particles of the metal immediately after they are produced through reduction, and growth of the particles and introduction of nitrogen in the grown surface of the particles proceed simultaneously. In the thus-obtained particle, nitrogen is uniformly incorporated from the surface to the inside, to form a solid solution, and the particle rarely contains a crystalline nitrogen compound.

Therefore, when the metallic powder produced through the above-described method is employed, an anode electrode of high reliability can be produced, as compared with the case in which there is employed metallic powder which is produced through a conventional method in which diffusion of nitrogen in particles determines reaction rate and agglomerated powder is thermally treated in an atmosphere containing nitrogen.

In addition, in the above-described method, an additional process for doping nitrogen is not required, which results in excellent productivity.

The present invention will next be described in detail by way of examples. Unless otherwise indicated herein, all parts, percents and ratios and the like are by weight.

EXAMPLES

Example 1

Potassium fluoride and potassium chloride (each 15 kg), which serve as diluting salts, were added to a reaction container (50 L), and heated to 850° C., to thereby form a molten liquid. Subsequently, a nozzle was inserted into the molten liquid, and nitrogen gas was bubbled through the liquid via the nozzle at a flow rate of 750 ml/minute. Potassium fluorotantalate $K_2TaF_7$ (200 g) was added to the molten liquid, and after one minute, molten sodium (58 g) was added to the liquid and the resultant mixture was allowed to react for two minutes. This procedure was performed 30 times. During the reaction, nitrogen gas was continuously bubbled through the liquid.

After completion of reduction, the resultant cake was ground and washed with a weakly acidic aqueous solution, separating tantalum particles. In addition, the particles were washed with a solution containing hydrofluoric acid and hydrogen peroxide for purification. The yield of particles of reduced tantalum was 1.6 kg.

The thus-produced tantalum particles exhibited the following characteristics.
BET specific surface area: 1.8 m²/g
Mean primary particle size: 200 nm
Amount of nitrogen: 5,800 ppm
X-ray diffraction data:
Nitrogen: Solid solution state, and no crystalline phase
Interplane distance of Ta (110) planes: 2.3400 Å

Subsequently, water was added to particles of reduced tantalum (dried particles) (100 g) while the particles were vibrated, so as to wet all of the particles uniformly and to form lumps, for carrying out pre-agglomeration. In this case, phosphoric acid was added to water in advance such that the amount of phosphoric acid was approximately 200 ppm with respect to that of tantalum. Approximately 25ml of water was employed to form the lumps. Subsequently, the lumps were heated in a vacuum heating furnace at 1,200° C. for one hour, for thermal agglomeration.

The thus-thermally agglomerated lumps were coarsely ground by use of a ceramic roll crusher, and further ground by use of a pin mill in an argon atmosphere, so as to attain a particle size of 250 μm or less. The resultant ground particles (100 g) were mixed with magnesium chips (6 g), and the mixture was maintained in a heating furnace having an argon atmosphere at 800° C. for two hours. Oxygen in the tantalum powder was reacted with magnesium for deoxidation. Thereafter, during the cooling process, air was fed into the argon gas, to thereby passivate and stabilize the tantalum powder, and the powder was removed from the furnace. The resultant powder was washed with an aqueous solution of nitric acid, and magnesium and magnesium oxide was washed and removed.

The characteristics of the thus-obtained powder were analyzed. The results are as follows.

BET specific surface area: 1.45 m$^2$/g

Mean primary particle size: 249 nm

Amount of oxygen: 4,800 ppm

Amount of nitrogen: 5,900 ppm

X-ray diffraction data:

Nitrogen: Solid solution state ($TaN_{0.04}$ and $TaN_{0.1}$, were detected as trace)

Interplane distance of Ta (110) planes: 2.3400 Å

Camphor (5 wt. %) was added to the above-obtained powder, and mixed together. The mixture was press-shaped, and sintered at 1,300° C. for 30 minutes. The resultant sintered body was subjected to X-ray diffraction in order to analyze the form of nitrogen in the same manner as described above. Nitrogen was contained in the sintered body substantially in a solid solution state, as in the case of the powder, and very small amounts of $TaN_{0.04}$ and $TaN_{0.1}$, were detected. However, the interplane distance of Ta (110) planes was 2.3400 Å, and it was confirmed that most of the nitrogen in the tantalum sintered body formed a solid solution.

Example 2

A KCl—NaCl eutectic composition salt (200 g) was charged into a crucible formed of dense alumina ($Al_2O_3$) having a inner diameter of 42 mm and a height of 155mm, and the salt was vacuum-dried at 200° C. for two hours. Ar gas was introduced into the crucible so as to have an argon atmosphere, and the crucible was then heated to 900° C. and maintained at that temperature. Subsequently, a porous crucible formed of magnesium oxide (MgO) having an inner diameter of 19 mm, which contains magnesium serving as a reducing agent, was placed in the resultant molten salt, and maintained in the salt for one hour. Magnesium as a reducing agent was melted in the molten salt through the pores of the porous crucible formed of magnesium oxide (MgO).

The head of a lance (pipe) formed of MgO having a diameter of 8 mm was inserted into the molten salt. Tantalum pentachloride gas heated to 300° C. was introduced into the molten salt through the lance together with nitrogen gas serving as a carrier gas, and tantalum pentachloride was reacted with magnesium melted in the molten salt. The reaction proceeded in a relatively rapid manner. The flow rates of the nitrogen gas and tantalum pentachloride gas were 0.5 Nl/minute and 1 g/minute, respectively, and these gasses were continuously fed into the molten salt for 30minutes.

Immediately after completion of supply of tantalum pentachloride, the crucible containing the magnesium and the lance was removed from the molten salt, and the salt was allowed to cool.

After the molten salt was cooled, the salt was washed with flowing water and an aqueous acetic acid solution, and the salt was subjected to centrifugation, separating tantalum powder and water. The resultant tantalum powder was dried.

The thus-obtained tantalum powder was subjected to ultimate analysis by means of energy diffusion X-ray spectroscopy (EDX). In addition, the phase of nitrogen was identified by use of a powder x-ray diffraction apparatus, and the shape of the powder was analyzed under a scanning electron microscope (SEM).

The characteristics of the powder were as follows.

BET specific surface area: 0.80 m$^2$/g

Mean primary particle size: 450 nm

Amount of oxygen: 2,800 ppm

Amount of nitrogen: 4,200 ppm

X-ray diffraction data:

Nitrogen: Solid solution state. No crystalline phase was observed

Interplane distance of Ta (110) planes: 2.3399 Å

Interplane distance of Ta (110) planes was 2.3400 Å, and it was confirmed that nitrogen was contained in the tantalum powder to form a solid solution. The powder particle has a diameter of approximately 0.4 μm and a column-like shape similar to a whisker.

Comparative Example 1

The procedure of Example 1 was repeated, except that nitrogen gas was not employed for bubbling, to thereby yield reduced tantalum particles. Briefly, a tantalum compound was reduced, the resultant tantalum particles were washed with a weakly acidic aqueous solution, and the particles were further purified with a solution containing hydrofluoric acid and hydrogen peroxide, to thereby yield reduced tantalum particles (1.6 kg).

The thus-obtained tantalum particles exhibited the following characteristics.

BET specific surface area: 1.5 m$^2$/g

Mean primary particle size: 240 nm

Amount of nitrogen: 20 ppm

Subsequently, in the same manner as in Example 1, the particles were subjected to pre-agglomeration, thermal agglomeration, and deoxidation. A heating furnace was cooled to 500° C., and the particles were maintained in the furnace at 500° C. for 10 hours while argon gas containing pure nitrogen in an amount of 10 vol. % was fed to the furnace. Thereafter, in the same manner as in Example 1, the tantalum powder was passivated and stabilized, and then removed from the furnace. The resultant powder was washed with an aqueous solution of nitric acid, and magnesium and magnesium oxide was washed and removed.

The characteristics of the thus-obtained powder were analyzed. The results are as follows.

BET specific surface area: 1.35 m$^2$/g

Mean primary particle size: 268 nm

Amount of oxygen: 5,100 ppm

Amount of nitrogen: 4,200 ppm

X-ray diffraction data:

Nitrogen: The peaks of tantalum nitrides ($TaN_{0.04}$ and $TaN_{0.1}$) were apparently detected Interplane distance of Ta (110) planes: 2.3375 Å

As was apparent from the data of interplane distance, most of the nitrogen in the powder formed crystalline nitride.

In addition, in the same manner as in Example 1, a sintered body was formed from the powder, and the compact was analyzed through X-ray diffraction. The results were similar to those of the powder.

As described hereinabove, the nitrogen-containing metallic powder is suitable for producing an anode electrode that has high specific capacitance and low leakage current and that exhibits excellent reliability for a prolonged period of time.

In addition, the method for producing nitrogen-containing metallic powder of the present invention enables, at high productivity, production of nitrogen-containing metallic powder which uniformly contains nitrogen to form a solid solution from the surface of particles to the inside, and rarely contains crystalline nitride compounds.

Therefore, a porous sintered body comprising the nitrogen-containing metallic powder of the present invention and a solid electrolytic capacitor comprising the powder have low leakage current and exhibit excellent reliability for a prolonged period of time.

While the invention has been described in detail and with reference to specific embodiments thereof, it will be apparent to one skilled in the art that various changes and modifications can be made therein without departing from the spirit and scope thereof.

What is claimed is:

1. A nitrogen-containing metallic powder having a surface and an inside and comprising a metal containing 50-20,000 ppm nitrogen in a form of solid solution, and wherein substantially all of any nitrogen present in said nitrogen-containing metallic powder is in the form of solid solution, wherein the metal is tantalum, and said nitrogen is uniformly incorporated in said powder from the surface to the inside, wherein said metallic powder has a particle size of 250 µm or less.

2. A porous sintered body which is produced by sintering a nitrogen-containing metallic powder as recited in claim 1.

3. A solid electrolytic capacitor comprising an anode electrode which is formed of the porous sintered body as recited in claim 2.

4. The porous sintered body of claim 2, wherein said sintering is at a temperature of from about 1,000 to about 1,400° C.

5. The nitrogen-containing metallic powder of claim 1, wherein said metallic powder contains from 4,200 to 5,900 ppm nitrogen.

6. The nitrogen-containing metallic powder of claim 1, wherein said metallic powder is agglomerated.

7. The nitrogen-containing metallic powder of claim 1, wherein oxygen is present in said metallic powder in an amount of from 2,800 to 4,800 ppm.

8. The nitrogen-containing metallic powder of claim 1, wherein said metallic powder has a mean particle size of from 249 nm to 360 nm.

9. The nitrogen-containing metallic powder of claim 1, wherein said metallic powder has an interplane distance of Ta (110) planes of from 2.3399 to 2.3400 Å.

10. The nitrogen-containing metallic powder of claim 1, wherein said metallic powder has an interplane distance of Ta (110) planes that is about 0.1% greater than an interplane distance of Ta (110) planes of a nitrogen-containing metallic powder in which the nitrogen is not in a form of solid solution.

11. The nitrogen-containing metallic powder of claim 1, wherein phosphorous or boron, or both are present.

12. The nitrogen-containing metallic powder of claim 11, wherein said phosphorous or boron is present in an amount of 10 to 300 ppm.

13. A nitrogen-containing metallic powder having a surface and an inside and comprising a metal containing 50-20.000 ppm nitrogen in a form of solid solution, and wherein substantially all of any nitrogen present in said nitrogen-containing metallic powder is in the form of solid solution, wherein the metal is tantalum, and said nitrogen is uniformly incorporated in said powder from the surface to the inside, wherein said metallic powder has a mean particle size of about 80 to 500 nm and wherein said metallic powder has a BET surface area of from about 0.8 to about 1.8 m$^2$/g.

14. A nitrogen-containing metallic powder having a surface and an inside and comprising a metal containing 50-20,000 ppm nitrogen in a form of solid solution, and wherein substantially all of any nitrogen present in said nitrogen-containing metallic powder is in the form of solid solution, wherein the metal is tantalum, and said nitrogen is uniformly incorporated in said powder from the surface to the inside, wherein said metallic powder has a mean particle size of from 80 to 360 nm.

* * * * *

UNITED STATES PATENT AND TRADEMARK OFFICE
CERTIFICATE OF CORRECTION

PATENT NO.       : 7,473,294 B2
APPLICATION NO.  : 11/447063
DATED            : January 6, 2009
INVENTOR(S)      : Oda et al.

Page 1 of 1

It is certified that error appears in the above-identified patent and that said Letters Patent is hereby corrected as shown below:

Claim 13, column 12, line 26, "50-20.000 ppm nitrogen" should read --50-20,000 ppm nitrogen--

Signed and Sealed this

Seventeenth Day of February, 2009

JOHN DOLL
*Acting Director of the United States Patent and Trademark Office*